No. 812,439. PATENTED FEB. 13, 1906.
F. MURPHY.
BUTTER PRESS.
APPLICATION FILED MAY 16, 1905.
3 SHEETS—SHEET 1.
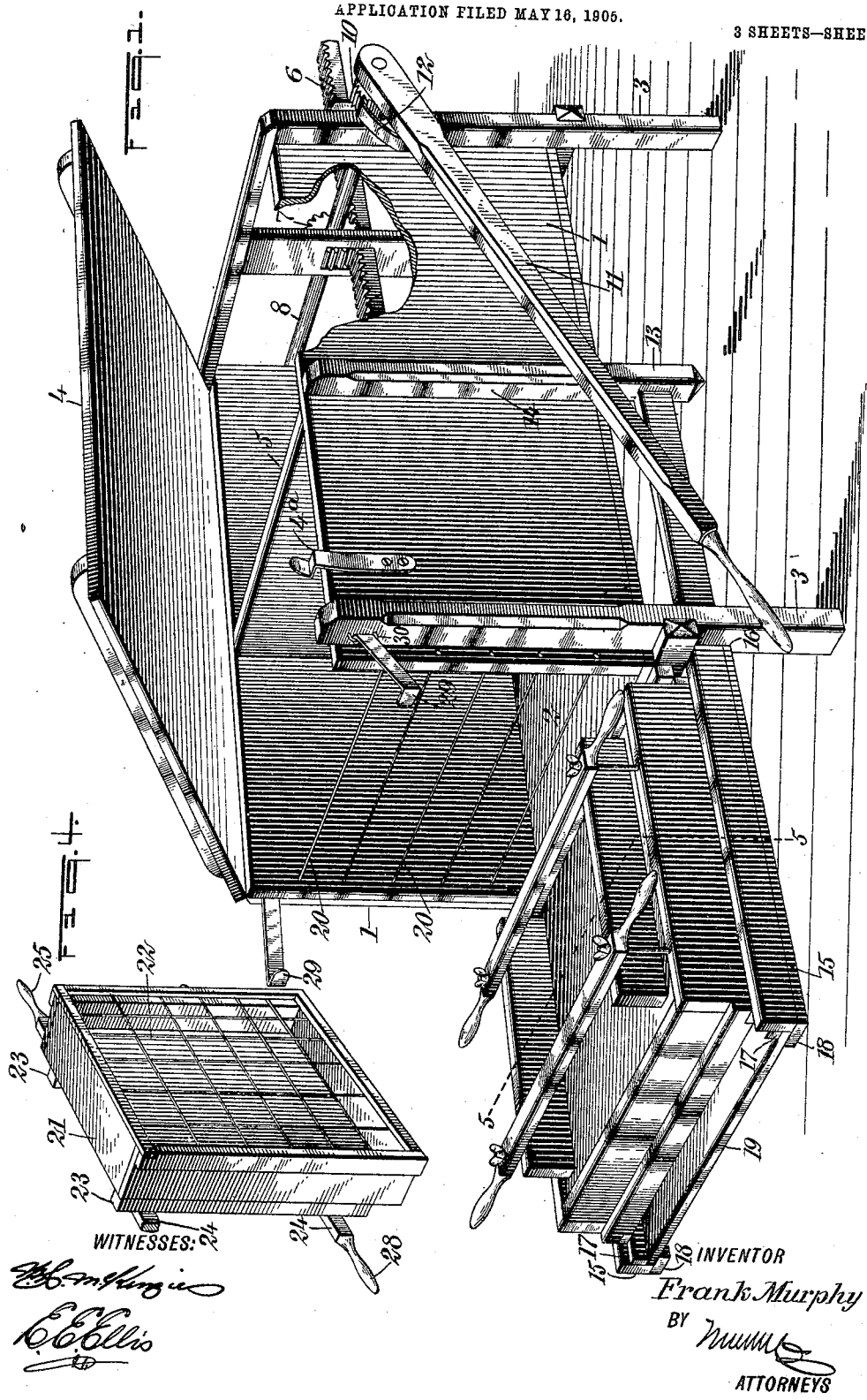
WITNESSES:
INVENTOR
Frank Murphy
BY
ATTORNEYS

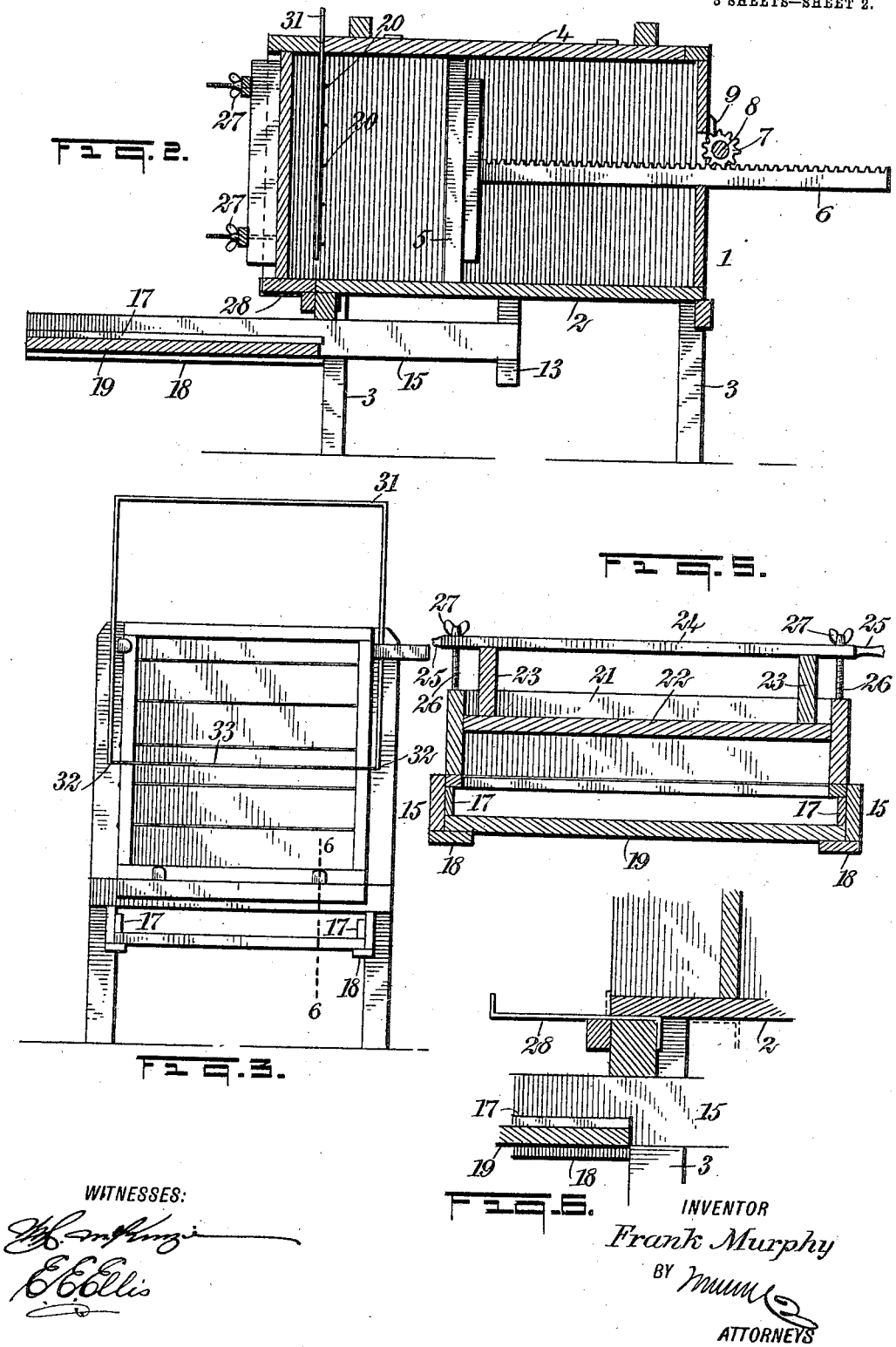

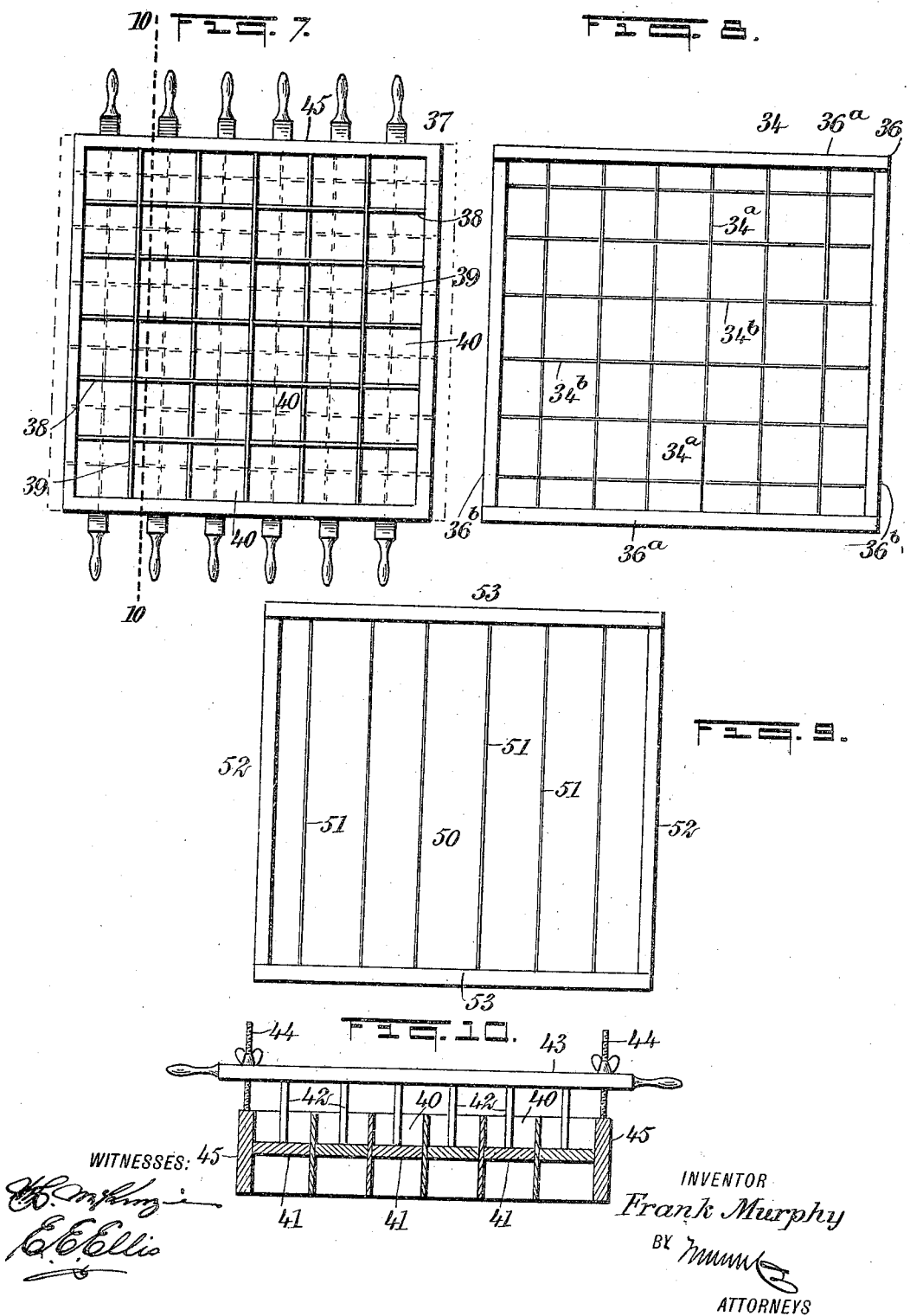

UNITED STATES PATENT OFFICE.

FRANK MURPHY, OF LISBON, NEW YORK.

BUTTER-PRESS.

No. 812,439.  Specification of Letters Patent.  Patented Feb. 13, 1906.

Application filed May 16, 1905. Serial No. 260,695.

*To all whom it may concern:*

Be it known that I, FRANK MURPHY, a citizen of the United States, and a resident of Lisbon, in the county of St. Lawrence and State of New York, have invented a new and Improved Butter-Press, of which the following is a full, clear, and exact description.

This invention relates to presses for butter and similar substances; and it consists, substantially, in the details of construction and combinations of parts hereinafter more particularly described, and pointed out in the claims.

One of the principal objects of the invention is to provide means by which butter or a like substance may be molded into a plurality of prints, each possessing any desired shape, dimensions, and weight, and also to simplify the construction of presses of this character, as well as to greatly reduce the labor attending the manipulations or operations thereof.

A further object is to provide a press for the purpose specified the coöperative elements of which may be readily assembled together for use and again taken apart, either for the purposes of cleansing or repairing or for other purposes.

The above and additional objects are attained by means substantially such as are illustrated in the accompanying drawings, in which—

Figure 1 is a perspective view of a butter-press embodying my improvements, said view being partly broken out and showing the cover or lid of the box or casing of the press as being in raised position. Fig. 2 is a longitudinal sectional view of the press on a somewhat-reduced scale. Fig. 3 is a front elevation thereof minus the receiving-mold for portions of the butter or similar material as it is forced or expressed from the forward end of the box or casing. Fig. 4 is a view in perspective of the receiving-mold for the butter having applied thereto one of the devices which I employ for cutting the butter into a plurality of pats of any desired shape or dimensions. Fig. 5 is a transverse sectional view (the box or casing not appearing) taken on the line 5 5 of Fig. 1. Fig. 6 is a sectional detail view taken on the line 6 6 of Fig. 3. Fig. 7 is a top plan view representing a modification of the receiving-mold for the butter or like material. Fig. 8 is a plan view of a cutting device to be applied to the receiving-mold shown in Fig. 7 for the purpose of separating the butter contained in such receiving-mold into pats of a certain size and weight. Fig. 9 is a similar view of another form of cutting device to be similarly applied to the receiving-mold shown in Fig. 7 for separating the butter contained in such mold into pats of a size and weight different from those produced by the cutting device shown in Fig. 8, and Fig. 10 is a sectional view taken on the line 10 10 of Fig. 7.

Before proceeding with a more detailed description it may be stated that in the form of my improvements herein shown I employ a box or casing of special construction in which the butter or other substance is placed in bulk, special means being also employed at one end of said box or casing for normally preventing the butter therein contained from bulging outwardly, said means also serving as a cutting device for separating expressed portions of the butter on certain lines as such portions are or may be forced from the casing into the receiving-mold therefor. The receiving-mold I employ is of special embodiment, combined with which may be employed at will either one of several specially-constructed cutting devices for separating or dividing the butter in said receiving-mold into a plurality of pats or blocks, the size and weight of which may vary accordingly as may be desired.

While I have herein represented my improvements in a certain preferred embodiment, it will be understood, of course, that I am not limited thereto in precise detail, since immaterial changes therein may be resorted to coming within the scope of my invention.

Reference being had to the drawings by the designating characters thereon, 1 1 represent the vertical side portions of a box or casing having a bottom 2, but being open at the top as well as at each end thereof, as shown. Said casing is supported at any desired height by means of suitable uprights 3, preferably located at the ends thereof, and hinged to the upper edge of one of the said side portions 1 is a lid or cover 4 for the casing, adapted to be raised and lowered, as occasion may require, suitable spring-fastenings 4ª being employed to secure the same in closed position. Working within the said box or casing is a plunger 5, extending rearwardly from which is a rack-bar 6, the teeth of which are engaged by the teeth of a pinion 7, rigidly mounted centrally of a shaft 8, suitably supported in bearings 9 therefor secured to the rearward faces of the rearward supporting-uprights 3 for the box or casing at the proper height. Said shaft also has rigidly mounted thereon at one of its projecting ends a ratchet 10, while loosely mounted on this end of the shaft is an end of an operating-lever 11, carrying on the inner side thereof a pawl 12, the free end of which engages the teeth of the said ratchet 10 whenever the operating-lever is elevated or raised at the free end thereof. Thus it will be seen that on each upward movement imparted to the operating-lever 11 the plunger 5 will be sent or driven forwardly an extent proportionate to the rotative movement imparted to the shaft 8, and in this way the bulk of butter or other substance contained within the box or casing in advance of the said plunger will be urged forwardly with the latter in an obvious manner. The means described for thus moving the plunger forwardly is such as has been found advantageous in practice; but it is apparent that I am not limited thereto, as various means may be employed therefor. Indeed, I may dispense with the shaft 8, the pinion 7, and ratchet 10, together with the operating-lever 11 and pawl 12, and operate the plunger by hand directly from the rack-bar, in which event this rack-bar may be a simple rod minus any teeth thereon. As before stated, however, I prefer the operating devices for the plunger, such as are herein described and illustrated.

Secured within notches therefor in the inner faces of the hanging portions 13 of corresponding members 14, applied to the outer faces of the side portions 1 of the box or casing, are the rearward extremities of parallel side members 15, which are similarly supported in notches 16 therefor in the inner faces of the forward upright-supporting members 3 for the box or casing, and which members project forwardly beyond the structure a suitable distance and are provided with longitudinal strips 17 and 18, forming guides for the longitudinal edges of a slidable and removably tray 19, (see Fig. 1,) it being noted that the height of the said strips 17 is considerably less than the height of the parallel members 15 from the upper surface of said tray.

Secured transversely of the box or casing at the forward upper end thereof are a plurality of wires 20, disposed suitable distances from each other and having the ends thereof properly fastened or secured after passing through openings therefor in the side portions 1 of the box or casing near the forward vertical edges thereof, (see Fig. 1,) one of the functions of said wires being to prevent the forward portions of the bulk or butter or similar substance within the box or casing from bulging outwardly and falling onto the tray during the intervals of the operation of cutting or separating into pats the portions of butter previously expressed into the receiving-mold therefor. Said receiving-mold is indicated in Fig. 4 and comprises an open rectangular frame 21, within which works a plunger 22, provided on the outer or rear face thereof with vertical strips 23, which are connected by upper and lower horizontal bars 24, having handles 25, each of said bars having openings therein, through which extend the threaded portions of screws 26, secured in the adjacent portions of the said rectangular frame 21 and having thereon adjusting-nuts 27, by which the position of the said plunger 22 within the receiving-mold may be varied in order that the depth or thickness of the expressed portions of butter received into this mold may be correspondingly varied. In one use of my improved butter-press said receiving-mold is mounted at the forward end of the box or casing upon forwardly-projecting brackets 28 therefor, whereupon the upper part of this mold is caught and caused to be held in position by means of spring-catches 29, pivoted at 30 to the forward faces of the forward upright supports 3 for the box or casing, it being understood that the proper adjustment of the plunger 22 within the receiving-mold (rectangular frame 21) has previously been made. The lever 11 is now operated in the manner hereinbefore described by which to drive or urge forwardly the plunger 5 within the box or casing, the action of this plunger causing the bulk of butter or other substance within the box or casing to be pushed forwardly in such manner that portions thereof will be separated horizontally by means of the wires 20 and these separated portions expressed or discharged into the said receiving-mold. When this has been done, a hand-operated device 31, comprising a rectangular frame having the free end portions 32 thereof connected by a wire 33, is inserted between the pivoted spring-catches for the receiving-mold in such manner that the wire 33 of said cutting device 31 will enter the space separating the edges of the receiving-mold from the adjacent forward edges of the box or casing, so that by exerting a downward pressure upon the said cutting device 31 the portion of butter which has been expressed into the receiving-mold from the bulk contained in the box or casing will be severed or separated from the bulk in a vertical direction, thereby enabling the receiving-mold to be detached from its position at the forward end of the box or casing with the said expressed portion of the butter therein.

To separate the expressed portion of butter contained in the receiving-mold, (rectangular frame 21,) a cutting device 34, Fig. 8, may be applied to the edges of the receiving-mold lying in advance of the face of the plunger within said mold, and then by inverting the said receiving-mold, together with the cutting device 34, thus applied thereon, and placing the same in reverse position above the slidable tray 19, by seating parallel members of the rectangular frame 36 of said cutting device upon the upper edges of the hereinbefore-mentioned strips 17, the butter contained within the receiving-mold may be dislodged or expelled therefrom onto the tray 19 by simply taking hold of the handles 25 and forcing or pressing the said plunger 22 therein downwardly, all of which, it is thought, will be apparent. The said cutting device 34, as shown, is provided with cutting-wires 34$^a$ and 34$^b$, crossing each other at right angles and having the ends thereof secured in the two sets of oppositely-disposed members 36$^a$ and 36$^b$, comprising the said rectangular frame 36.

As shown in Fig. 7, I prefer in some instances to construct the receiving-mold 37 with partitions 38 and 39, crossing each other in opposite directions, thus to form parallel rows of cells 40, and for each cell I provide a separate plunger 41, (see Fig. 10,) the plungers of each row having the stems 42 thereof connected by an independent operating-bar 43, which is adjustable on screws 44, entering the edges of parallel members 45 of the said receiving-mold. This particular form of receiving-mold may be applied to the forward end of the box or casing in like manner as has hitherto been explained with reference to the receiving-mold (rectangular frame 21) first mentioned. Then when the same has been detached or removed after having portions of the bulk of butter expressed thereinto it is apparent that by operating each one of the connecting-rods 43 for the plungers 41 of each separate row said rows or plungers may be separately operated to dislodge or eject therefrom a plurality of pats of butter which, for instance, may be of one pound weight each. Should it be desired to subdivide the pats of butter comprising the several rows thereof just mentioned into pats weighing one-quarter pound each, then it is simply necessary to apply to the said receiving-mold 37 the cutting device 34, so as to bring the wires 34$^a$ and 34$^b$ of this cutting device in the position by which to cross the cells of the receiving-mold 37 centrally thereof at right angles, as shown in dotted lines in Fig. 7. Still further, should it be desired to subdivide each of the pats of butter formed in the cells of the receiving-mold 37 into subdivisions weighing one-half pound each, then the cutting device 50 (shown in Fig. 9) may be applied to the said receiving-mold 37 in like manner to cause the single set of parallel wires 51 thereof to cross the cells 40 centrally thereof in one direction only, it being explained that this cutting device 50 is constructed substantially the same as the cutting device 34 and comprises sets of parallel members 52 and 53.

Whenever the pats are ejected or dislodged from the receiving-mold onto the tray 19, the latter may be removed and another tray substituted in its place, and the hereinbefore-described operation may be repeated over and over again. It will be seen that the entire structure is very simple and capable of being easily operated and controlled, the expense of the manufacture thereof being very small, owing to the fact that almost the entire structure may be made of any ordinary form of light wood.

By means of my improvements the pressing of butter or like substance into pats may be effectively and rapidly carried out, and it is thought that no further detailed description is necessary to a complete understanding of the workings of the press.

As hereinbefore stated, the function of the parallel members 15 is to support the slidable and removable tray 19 through the intermediacy of the longitudinal strips 17 and 18.

Having thus described my invention, I claim as new and desire to secure by Letters Patent—

1. A butter-press, comprising a casing for containing the butter in bulk, provided with forward and rearward supports, the former having notches therein, said casing also having hanging portions provided with corresponding notches, a mold for receiving expressed portions of butter from the casing, projecting parallel longitudinal members, and a removable slidable tray supported thereby, upon which the mold may be placed in operation, said members having portions thereof seated in said notches of the forward supports and hanging portions.

2. A butter-press, comprising a casing for containing the butter in bulk, provided with forward and rearward supports, the former having notches therein, said casing also having hanging portions provided with corresponding notches, a mold for receiving expressed portions of butter from the casing, projecting parallel longitudinal members, and a removable slidable tray supported thereby, upon which the mold may be placed in operation, said members having portions thereof seated in said notches of the forward supports and hanging portions and said casing having a movable plunger therein.

3. A butter-press comprising a casing for containing the butter in bulk, provided with forward and rearward supports, the former having notches therein, said casing also having hanging portions provided with corresponding notches, a mold for receiving expressed portions of butter from the casing, projecting parallel longitudinal members, and a removable slidable tray supported thereby, upon which the mold may be placed in operation, said members having portions thereof seated in said notches of the forward supports and hanging portions and said casing having a movable plunger therein and provided with means for operating the plunger.

In testimony whereof I have signed my name to this specification in the presence of two subscribing witnesses.

FRANK MURPHY.

Witnesses:
WALTER ROBINSON,
ERNEST M. AKINS.